(12) United States Patent
Bundy

(10) Patent No.: US 8,059,812 B1
(45) Date of Patent: Nov. 15, 2011

(54) DISTRIBUTED CALL-ROUTING SYSTEMS

(75) Inventor: Bruce Bundy, Santa Cruz, CA (US)

(73) Assignee: LiveOps, Inc., Santa Clara, CA (US)

( * ) Notice: Subject to any disclaimer, the term of this patent is extended or adjusted under 35 U.S.C. 154(b) by 1250 days.

(21) Appl. No.: 11/787,000

(22) Filed: Apr. 13, 2007

(51) Int. Cl.
*H04M 3/00* (2006.01)
(52) U.S. Cl. ......... 379/265.02; 379/265.05; 379/265.11; 379/266.01; 379/265.12
(58) Field of Classification Search ............. 379/265.02, 379/265.05, 265.11–265.14
See application file for complete search history.

(56) References Cited

U.S. PATENT DOCUMENTS

| 6,041,130 | A  | * | 3/2000 | Goss .............................. 381/374 |
| 6,320,956 | B1 | * | 11/2001 | Cherry ...................... 379/265.02 |
| 6,687,241 | B1 | * | 2/2004 | Goss .............................. 370/352 |
| 2004/0042611 | A1 | * | 3/2004 | Power et al. ............. 379/265.02 |
| 2006/0147026 | A1 | * | 7/2006 | Statham et al. .......... 379/265.02 |
| 2007/0064912 | A1 | * | 3/2007 | Kagan et al. .............. 379/265.1 |
| 2008/0008309 | A1 | * | 1/2008 | Dezonno et al. ......... 379/265.02 |
| 2008/0021998 | A1 | * | 1/2008 | Wentink ......................... 709/226 |
| 2008/0192908 | A1 | * | 8/2008 | O'Keefe et al. ............. 379/93.17 |
| 2008/0225872 | A1 | * | 9/2008 | Collins et al. .................. 370/412 |
| 2009/0110182 | A1 | * | 4/2009 | Knight et al. ............ 379/265.12 |

OTHER PUBLICATIONS

U.S. Appl. No. 10/886,333, filed Jun. 5, 2008, Everingham et al.

* cited by examiner

*Primary Examiner* — Joseph J Nguyen
(74) *Attorney, Agent, or Firm* — PatentEsque Law Group, LLP

(57) ABSTRACT

An exemplary method for selecting a resource for handling a call in a distributed call-routing system comprises obtaining, at a local call-routing proxy, a request for a resource to handle a call from a local automatic call director, distributing the request to a plurality of remote call-routing proxies, each remote call-routing proxy being configured to obtain responses to the request from a plurality of servers storing data relating to a plurality of resources, process the responses from the servers to produce a first reduced number of responses and send the first reduced number of responses to the local call-routing proxy, processing responses from remote call-routing proxies at the local call-routing proxy, enabling the local automatic call director to obtain a second reduced number of responses, and enabling the local automatic call director to select a resource to handle the call.

20 Claims, 10 Drawing Sheets

DISTRIBUTED CALL-ROUTING SYSTEMS

BACKGROUND

Call centers generally function to assist people seeking a product or a service. Calls to a call center may come from the traditional telephone network (e.g., the POTS) through the public switched telephone network (PSTN) or via voice over IP (i.e., VOIP). Calls received from the POTS can be translated to VOIP calls at a media gateway. VOIP calls may also be referred to as IP calls. IP calls directed to a particular telephone number can generally bypass a media gateway and be forwarded directly to a soft switch or an automatic call director. An automatic call director generally functions to direct calls to different resources within the call center (e.g., an interactive voice response system, an agent, etc.).

A call center generally includes telephony infrastructure, computing infrastructure, and access to agents for handling calls. The computing infrastructure may include clusters of computing devices and applications running on the computing devices to perform various call center functions. For instance, the functions of an automatic call director may be implemented in an application running on a computing device accessible to the call center.

Each cluster of computing devices may be independent of other clusters. Alternatively, multiple clusters of computing devices may be connected to each other in a distributed call-routing system.

As call volume increases, it is desirable for a call center to have access to a distributed call-routing system having efficient load sharing capabilities.

SUMMARY

An exemplary method for selecting a resource for handling a call in a distributed call-routing system comprises obtaining, at a local call-routing proxy, a request for a resource to handle a call from a local automatic call director, distributing the request to a plurality of remote call-routing proxies, each remote call-routing proxy being configured to obtain responses to the request from a plurality of servers storing data relating to a plurality of resources, process the responses from the servers to produce a first reduced number of responses and send the first reduced number of responses to the local call-routing proxy, processing responses from remote call-routing proxies at the local call-routing proxy, enabling the local automatic call director to obtain a second reduced number of responses, and enabling the local automatic call director to select a resource to handle the call based at least on the second reduced number of responses.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

I. Overview

Section II describes an exemplary cluster of computing devices for handling calls.

Section III describes an exemplary distributed call-routing system comprising multiple clusters of computing devices and exemplary processes for handling calls in this system.

Section IV describes another exemplary distributed call-routing system comprising multiple clusters of computing devices and exemplary processes for handling calls in this system.

Section V describes an exemplary process for selecting a resource at a resource server.

Section VI describes an exemplary process for selecting a resource for handling a call at an automatic call director.

Section VII describes other exemplary implementations.

Section VIII describes exemplary call center routing rules.

Section IX describes an exemplary operating environment.

II. An Exemplary Cluster of Computing Devices

In an exemplary implementation, a call center may have access to one or more clusters of computing devices for processing calls.

Figure 1:
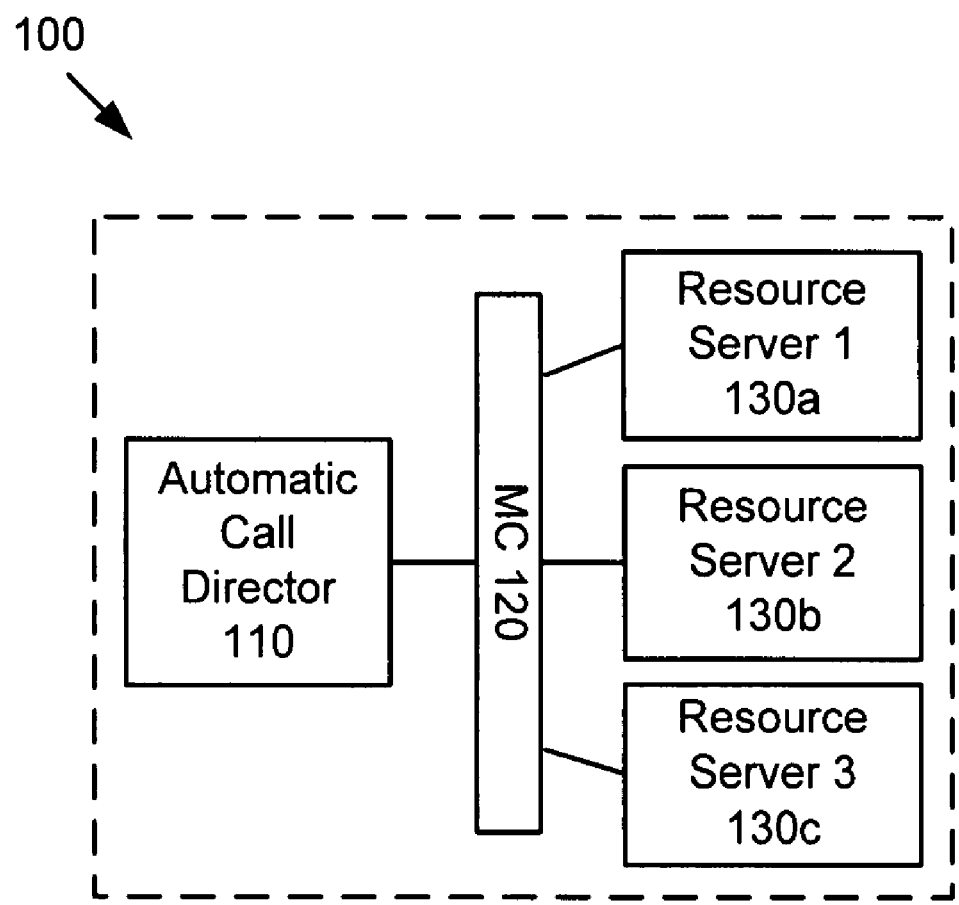
FIG. 1 illustrates an exemplary cluster of computing devices for routing calls.

FIG. 1 illustrates an exemplary cluster of computing devices 100. The cluster of computing devices 100 includes an automatic call director 110, a multicast channel 120, and multiple resource servers 130. A person skilled in the art will recognize that the cluster of computing devices 100 may include other components for facilitating call-routing. For ease of explanation, however, these other components are not illustrated or described. The number of automatic call directors 110 and resource servers 130 illustrated in the cluster of computing devices 100 is merely exemplary. More or fewer automatic call directors 110 and/or resource servers 130 may be implemented depending on design choice.

In an exemplary implementation, depending on call center routing rules applicable to each call, the automatic call director 110 can intelligently route the call to any one (or more) communication resources. For example, a particular dialed telephone number may trigger the automatic call director 110 to route the call to a specific pool of agents or activate a specific processing unit. Exemplary call center routing rules will be described in more detail in Section VIII below.

In an exemplary implementation, resources may include, without limitation, queues, interactive voice response units (IVR unit), agents, other call centers, and/or other resources capable of handling calls.

The queues can hold incoming calls until another resource is available to handle the call. For example, if all the agents are currently busy, a call may be put into a queue until an agent is available to take the call. In this example, when an appropriate agent becomes available, the call may be removed from the queue and routed to the available agent.

The IVRs are automated systems that, depending on configuration, may be capable of performing a myriad of functions. For example, an IVR may be configured to guide a caller to a proper destination, take orders, process payments, receive information, and/or perform other functions, singly or in combination.

Agents are generally humans who have pre-registered with the call center and are able to take calls in real time. Groups of agents may be located at one or more physical locations. Alternatively or in combination, individual agents may be distributed in different locations (e.g., agents may work from home). In general, each agent of the call center can be assigned a dedicated phone number for a given session of work. Alternatively or in combination, each agent may be uniquely identifiable by the call center using any identification technologies known in the art.

Other resources may include other call centers. Each such call center may include its own automatic call director and other resources. Depending on call center routing rules, the automatic call director 110 may route a call to any resource at its disposal.

The resource servers 130 store data related to available resources. For example, attribute and performance information relating to agents who have pre-registered with a call center may be stored at a resource server.

In an exemplary implementation, when a automatic call director 110 receives a call from a caller, the automatic call director 110 may generate a request for a resource to handle the call and broadcast the request onto the multicast channel 120. In an exemplary implementation, resource servers 130 within the cluster of computing devices 100 are continuously (or periodically) listening to messages on the multicast channel 120. Thus, the resource servers 130 can obtain the request for a resource broadcasted by the automatic call director 110. After obtaining the request, each resource server 130 selects an appropriate resource (e.g., agent) for handling that call. In an exemplary implementation, a resource server may dynamically sort resources as they become available (e.g., as the resources log on to the resource server to announce their availability to handle calls) into resource pools. As a result, in response to a request of a resource from any particular pool, the resource server can select the top resource of the pool as previously sorted. Once a resource has been selected, each resource server 130 sends a response to the automatic call director 110 regarding the selected resource. In an exemplary implementation, the response is sent directly to the automatic call director 110 who initiated the request via a user datagram protocol (UDP) channel separate from the multicast channel 120. UDP is well known in the art and need not be described in more detail herein. In another exemplary implementation, the response can be broadcast onto the multicast channel 120. In the former implementation, packet traffic can be reduced. The automatic call director 110 obtains the responses (e.g., 1 response from each resource server) from the UDP and makes its own selection of the most suitable resource to handle the call.

Figure 2:
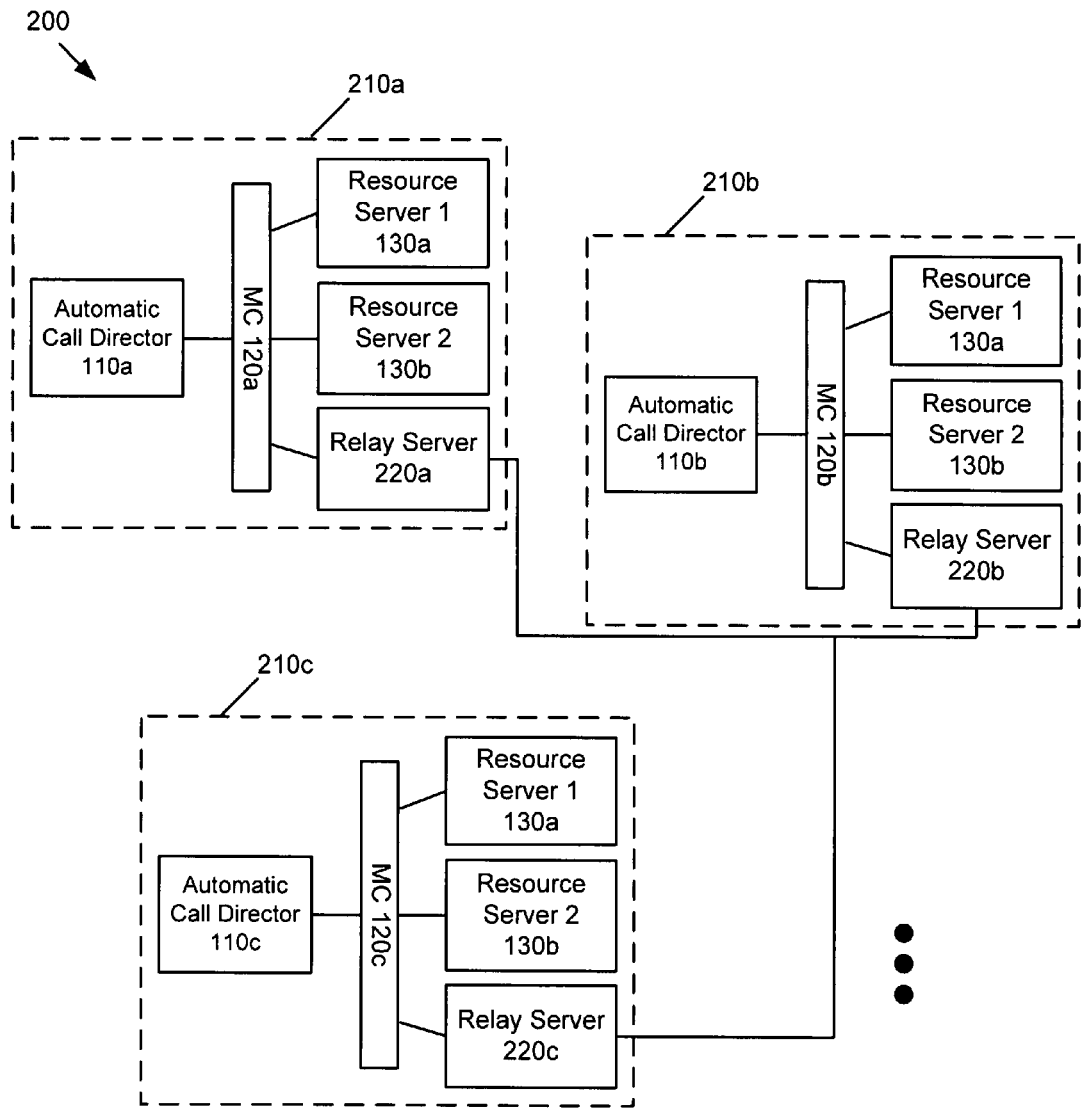
FIG. 2 illustrates an exemplary distributed call-routing system having multiple clusters of computing devices.

III. An Exemplary Distributed Call-Routing System Having Multiple Clusters of Computing Devices As call volume increases, multiple clusters of computing devices may be connected in a distributed system for load sharing purposes. FIG. 2 illustrates an exemplary distributed system 200 including multiple clusters of computing devices 210. The number of clusters of computing devices 210 illustrated in the system 200 is merely exemplary. More or fewer clusters of computing devices 210 may be implemented depending on design choice.

The exemplary cluster of computing devices 210 generally includes the same components as described above regarding the cluster of computing devices 100 except each cluster of computing devices 210 in FIG. 2 also includes a relay server 220. The relay server 220 at each cluster of computing devices 210 is connected to other relay servers 220 at other clusters of computing devices for relaying messaging being broadcasted on the local multicast channels 120 at each cluster of computing devices 210. In an exemplary implementation, the relay servers 220 are connected to each other by persistent transmission control protocol (TCP) connections. Each relay server 220 can be implemented in software or hardware, or a combination thereof. If implemented in software, instructions may be stored on a memory accessible to a processor for executing the instructions to perform relay server functions.

Figure 3:
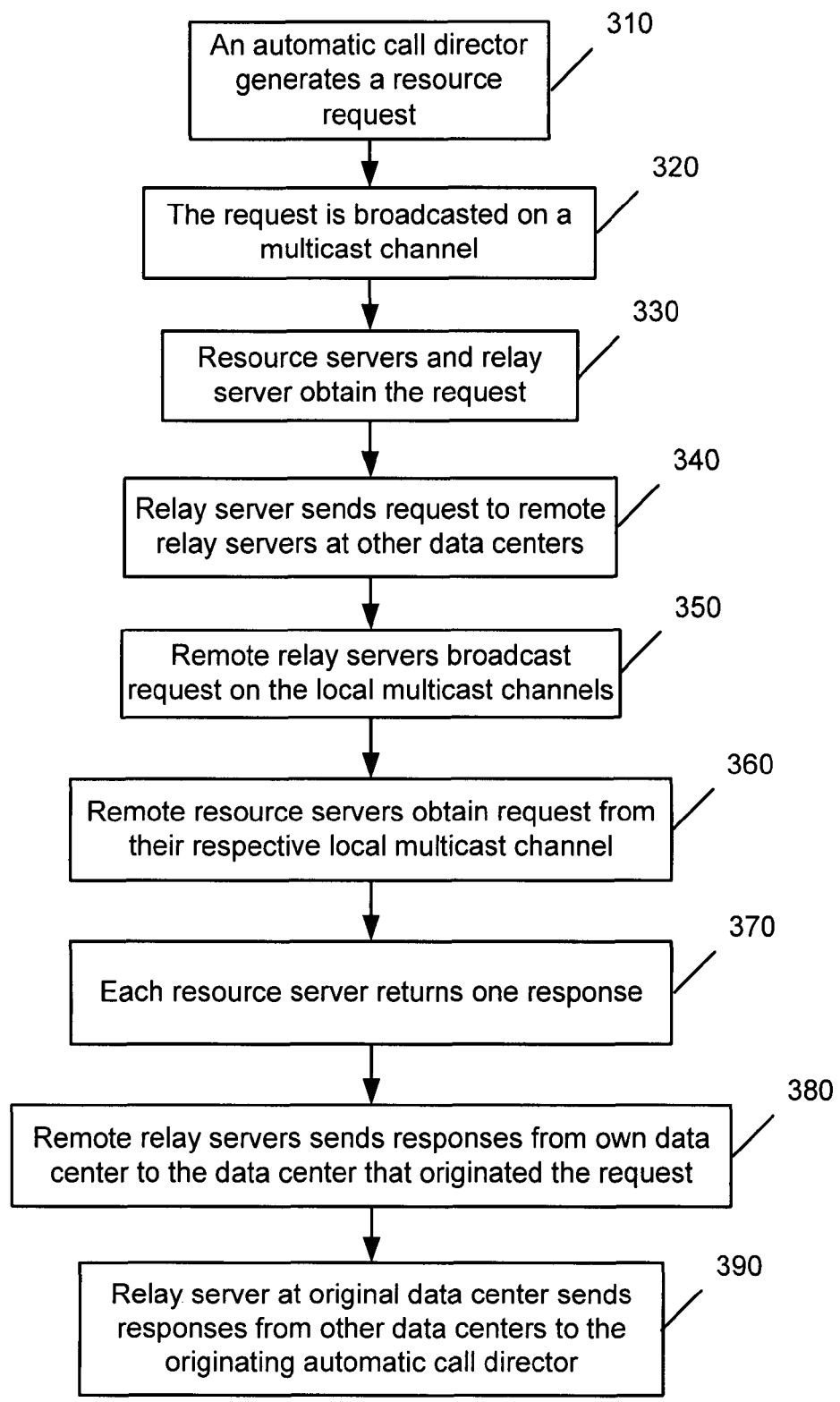
FIG. 3 illustrates an exemplary process in the exemplary system of FIG. 2 for sending a request for a resource to handle a call.
Figure 4:
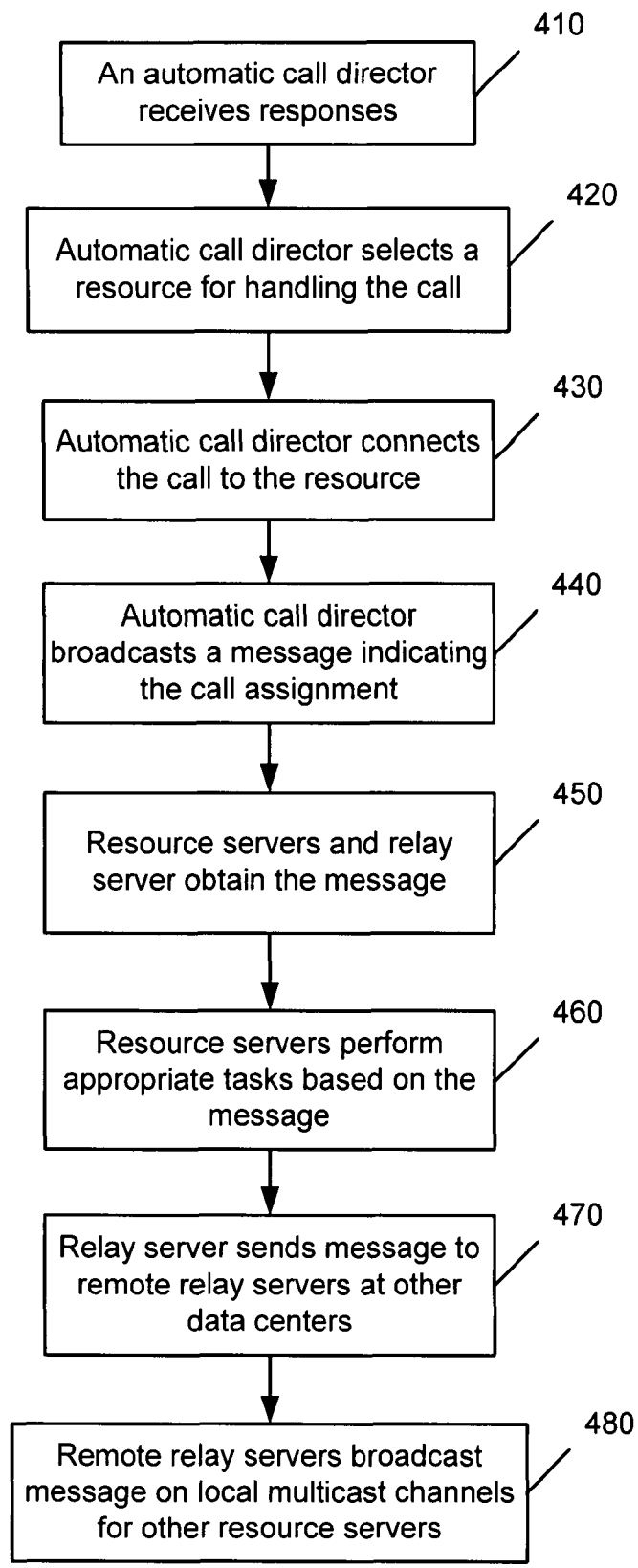
FIG. 4 illustrates an exemplary process in the exemplary system of FIG. 2 for selecting a resource to handle a call.

FIG. 3 illustrates an exemplary process for relaying automatic call director requests among clusters of computing devices. FIG. 4 illustrates an exemplary process for relaying resource server responses to originating automatic call directors.

For ease of explanation, the description of FIG. 3 and FIG. 4 will make references to the exemplary components illustrated in FIG. 2.

At step 310, an automatic call director 110a generates a resource request in response to receiving a call from a caller. In an exemplary implementation, the resource request may include a call identifier (call ID) and/or other information relating to the call received by the automatic call director 110a.

At step 320, the automatic call director 110a broadcasts the request onto a local multicast channel 120a.

At step 330, the resource servers 130 and relay server 220a obtain the request from the multicast channel 120a. In an exemplary implementation, the resource servers 130 may apply any available resource selection algorithm to select a resource in response to the automatic call director 110a request. An exemplary resource selection process will be described below with reference to FIG. 8.

At step 340, the relay server 220a sends the request over a network (e.g., the TCP persistent connection) to remote relay servers 220b and 220c at other clusters of computing devices 210b and 210c, respectively.

At step 350, the remote relay servers 220b and 220c broadcast the received request onto their respective local multicast channels 120b and 120c.

At step 360, the remote resource servers 130 at remote clusters of computing devices 210b and 210c obtain the request from their respective local multicast channels 120b and 120c.

At step 370, each resource server (whether local or remote) returns a response to the request by broadcasting the response onto a respective UDP channel (either directly to the originating automatic call director 110a if the resource servers are local, or directly to the remote relay servers 220b or 220c, respectively, if the resource servers are remote). In an exemplary implementation, the response may include the call ID, an identifier of a selected resource for handling the call, and/or other information to enable the originating automatic call director 110a to make an optimized selection. For example, the information may include attributes relating to the selected resource.

At step 380, the remote relay servers 220b and 220c obtain the responses from the remote resource servers and send the responses to the relay server 220a at the cluster of computing devices 210a that originated the request.

At step 390, the relay server 220a at the originating cluster of computing devices 210a sends the responses from remote relay servers 220b and 220c to the originating automatic call director 110a via a UDP channel. FIG. 4 illustrates an exemplary process for an automatic call director to select a resource for handling a call.

At step 410, the automatic call director 110a receives multiple responses from local resource servers 130 as well as responses from remote resource servers via the relay servers 220a-220c.

At step 420, the automatic call director 110a selects a resource for handling the call. In an exemplary implementation, the automatic call director 110a may apply any available resource selection algorithm to select a resource from among the choices obtained to handle the call. An exemplary resource selection process will be described below with reference to FIG. 9.

At step 430, the automatic call director 110a connects the call to the selected resource.

At step 440, the automatic call director 110a broadcasts a message on the multicast channel 120a indicating the call assignment. In an exemplary implementation, the message may include the call ID, the identifier of the assigned resource, and/or other information.

At step 450, both the local resource servers 130 and the relay server 220a obtain the message from the multicast channel 120a.

At step 460, depending on the identifier of the assigned resource, each local resource server 130 either releases the offered resource (if it is not the one assigned) or mark the offered resource as busy (if it is the one assigned).

At step 470, the relay server 220a sends the message to remote relay servers 220b and 220c at other clusters of computing devices 210a and 210b, respectively.

At step 480, the remote relay servers 220b and 220c broadcast the message on their respectively local multicast channel 120b or 120c. The remote resource servers perform appropriate tasks based on the message. For example, depending on the identifier of the assigned resource, each remote resource server either releases the offered resource (if it is not the one assigned) or marks the offered resource as busy (if it is the one assigned).

The distributed call-routing system 200 enables load sharing among multiple clusters of computing devices. As call volume continues to increase, however, a more scalable system may be implemented to reduce packet traffic and enhance call-routing efficiency.

Figure 5:
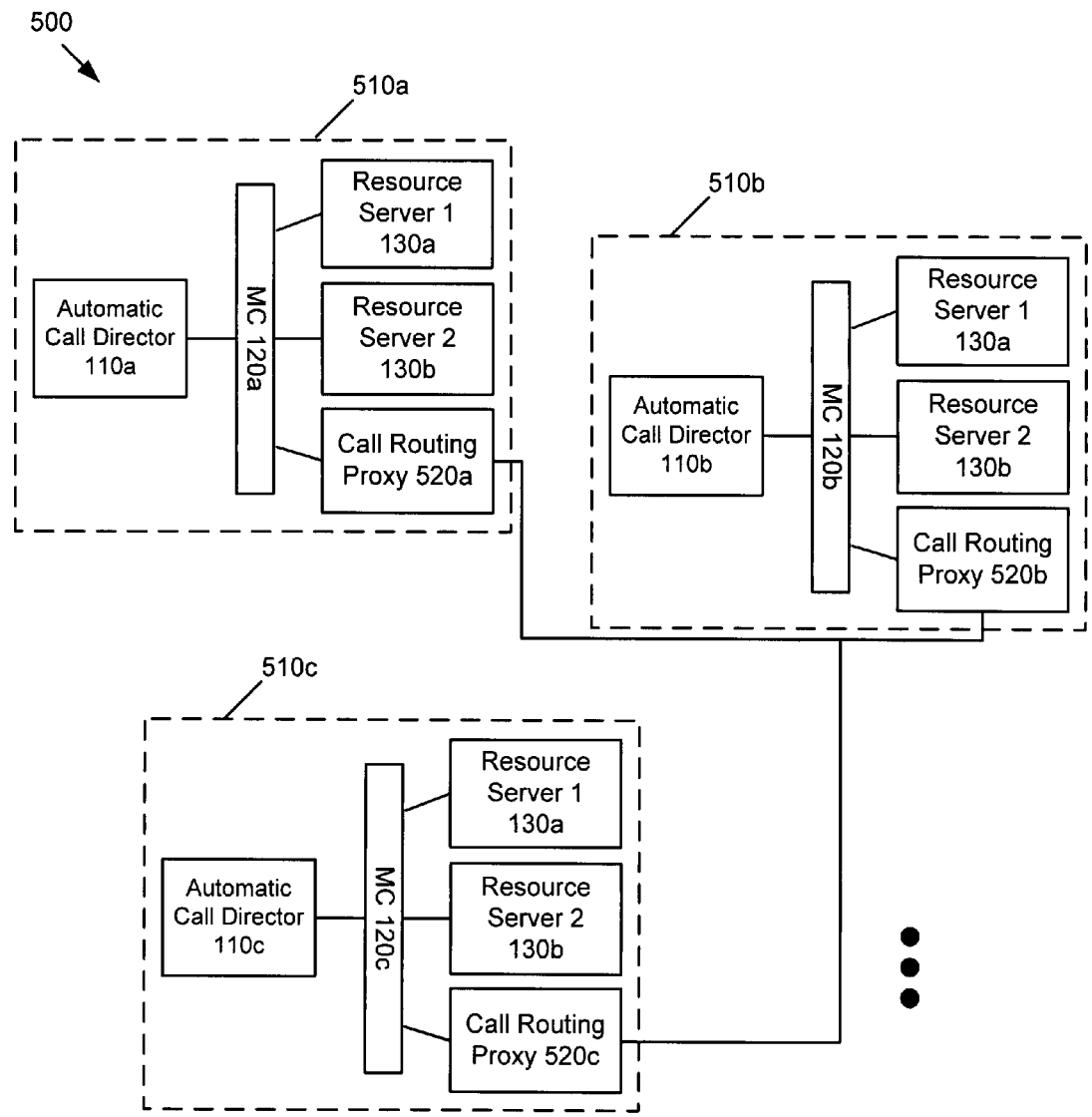
FIG. 5 illustrates another exemplary distributed call-routing system having multiple clusters of computing devices.

IV. Another Exemplary Distributed Call-Routing System Having Multiple Clusters of Computing Devices FIG. 5 illustrates another exemplary distributed call-routing system 500 including multiple clusters of computing devices 510. The number of clusters of computing devices 510 illustrated in the system 500 is merely exemplary. More or fewer clusters of computing devices 510 may be implemented depending on design choice.

The exemplary cluster of computing devices 510 includes the same components as described above regarding the cluster of computing devices 210 except the relay server 220 in the cluster of computing devices 210 is replaced by a call-routing proxy 520. Like the relay server 220, the call-routing proxy 520 at each cluster of computing devices 510 is connected to other call-routing proxies 520 at other clusters of computing devices. In an exemplary implementation, the call-routing proxies 520 are connected to each other by persistent transmission control protocol (TCP) connections.

Each call-routing proxy 520 can be implemented in software or hardware, or a combination thereof. If implemented in software, instructions may be stored on a memory accessible to a processor for executing the instructions to perform the call-routing proxy functions. In an exemplary implementation, a relay server may be upgraded to toggle between relay mode and call-routing proxy mode (e.g., by installing call-routing proxy software on the server memory).

Figure 6:
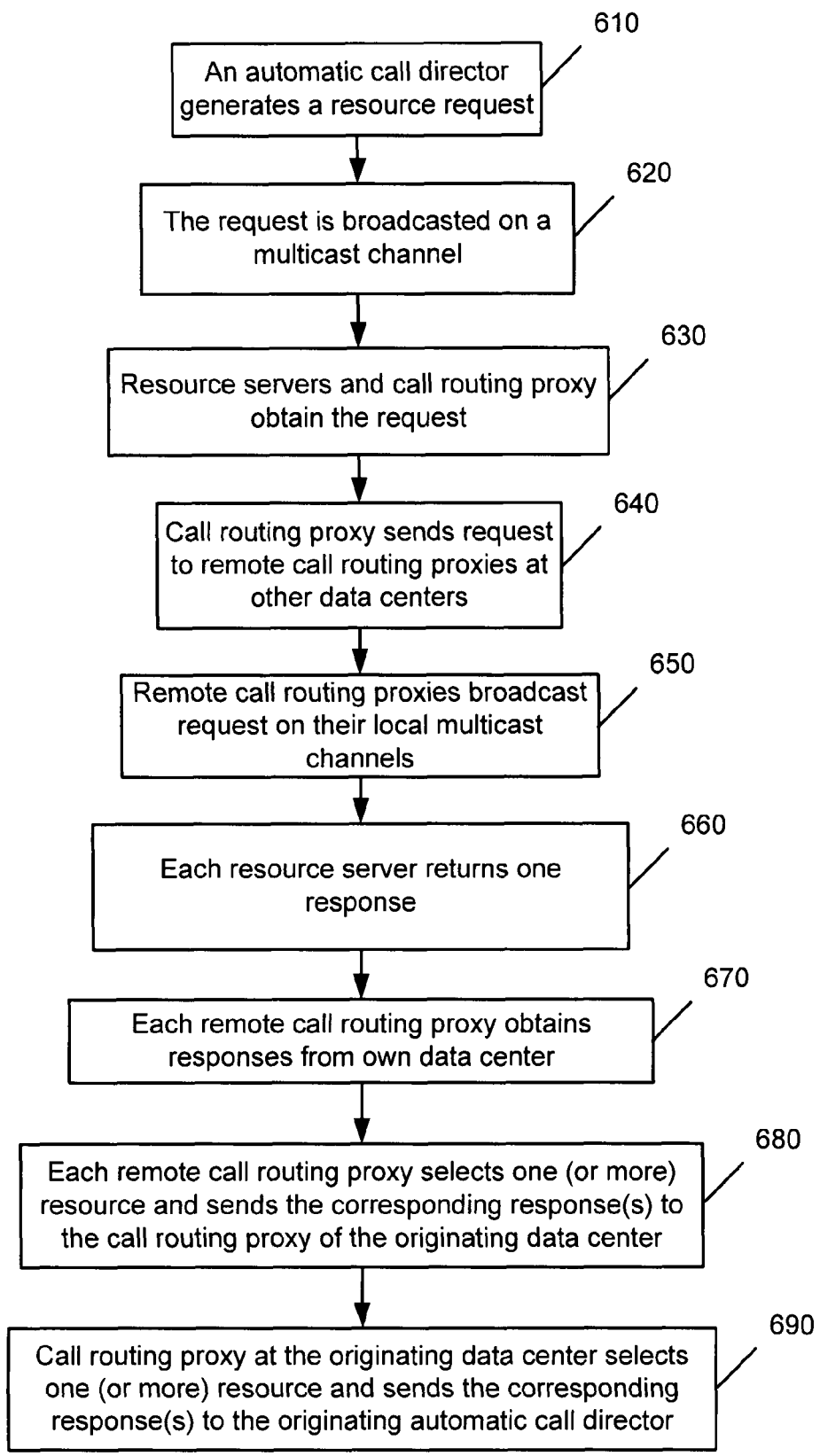
FIG. 6 illustrates an exemplary process in the exemplary system of FIG. 5 for sending a request for a resource to handle a call.
Figure 7:
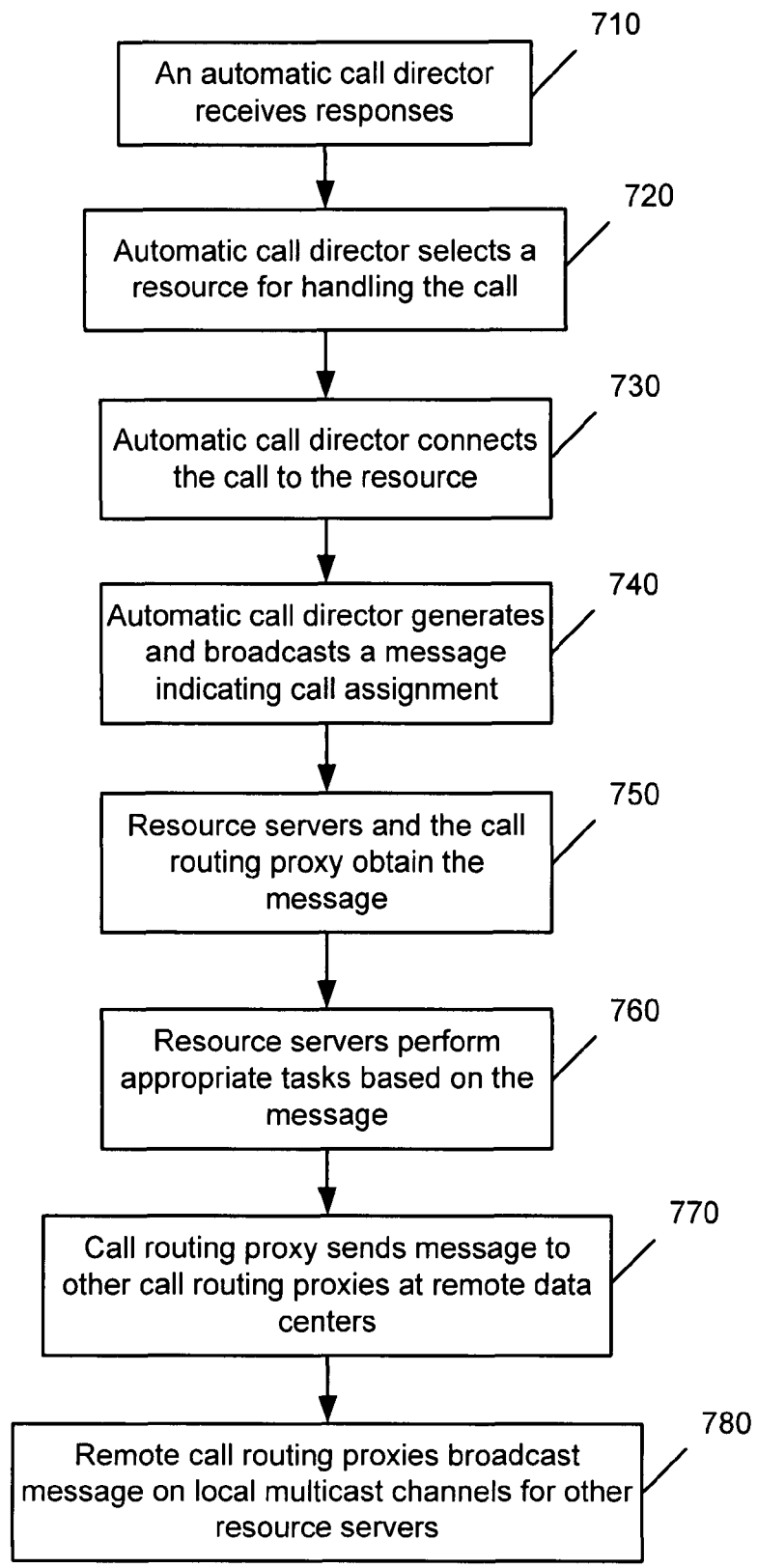
FIG. 7 illustrates an exemplary process in the exemplary system of FIG. 5 for selecting a resource to handle a call.

FIG. 6 illustrates an exemplary process for sending automatic call director requests to remote clusters of computing devices. FIG. 7 illustrates an exemplary process for processing resource server responses and sending processed results back to an originating automatic call director.

For ease of explanation, the description of FIG. 6 and FIG. 7 will make references to the exemplary components illustrated in FIG. 5. Furthermore, an assumption is made that the exemplary clusters of computing devices are implementing call-routing proxies 520. In actual implementation, clusters of computing devices having relay servers and clusters of computing devices having call-routing proxies can work together in one distributed system (which will be described below with reference to FIG. 10).

Referring now to FIG. 6, at step 610, an automatic call director 110a generates a resource request in response to receiving a call from a caller. In an exemplary implementation, the resource request may include a call identifier (call ID) and/or other information relating to the call received by the automatic call director 110a.

At step 620, the automatic call director 110a broadcasts the request onto a local multicast channel 120a.

At step 630, the resource servers 130 and call-routing proxy 520a obtain the request from the multicast channel 120a.

At step 640, the call-routing proxy 520a sends the request over a network (e.g., the TCP persistent connection) to remote call-routing proxies 520b and 520c at other clusters of computing devices 510b and 510c, respectively.

At step 650, the remote call-routing proxies 520b and 520c broadcast the received request onto their respective local multicast channels 120b and 120c.

At step 660, each resource server at (local or remote) clusters of computing devices 510a, 510b and 510c obtains the request from its local multicast channel 120a, 120b or 120c and returns a response. If a response server is in the same cluster of computing devices as the originating automatic call director 110a, the response from that response server can be directly sent to the automatic call director. If a response server is in a remote cluster of computing devices, the response from that response server can be sent directly to the remote call-routing proxy in the same remote cluster. In an exemplary implementation, the resource servers 130 may apply any available resource selection algorithm to select a resource. An exemplary resource selection process will be described below with reference to FIG. 8. In an exemplary implementation, the response may include the call ID, an identifier of a selected resource for handling the call, and/or other information to enable the local call-routing proxy (in the case of responses from remote resource servers, other call-routing proxies, or relay servers) or the originating automatic call director 110a (in the case of responses from local resource servers, local call-routing proxy, and/or local relay server) to make an optimized selection. For example, the information may include attributes relating to the selected resource.

At step 670, each call-routing proxy 520*b* or 520*c* at the remote clusters of computing devices 510*b* and 510*c*, respectively, obtains the responses from the local resource servers.

At step 680, each call-routing proxy 520*b* or 520*c* selects one (or more) of the resources being offered by its respective resource servers and sends the corresponding selection (as one or more responses) to the call-routing proxy 520*a* of the originating cluster of computing devices 510*a*. In an exemplary implementation, the call-routing proxy 520*b* or 520*c* may apply any available resource selection algorithm to select a resource. As a result of the selection process applied by the remote call-routing proxy 520*b* or 520*c*, the total number of responses being transmitted back to the originating cluster of computing devices can be reduced.

At step 690, the call-routing proxy 520*a* at the originating cluster of computing devices 510*a* receives multiple responses from other (i.e., remote) call-routing proxies 520*b* and 520*c*, selects one (or more) of the resources among the received responses, and sends its corresponding response to the originating automatic call director 110*a* via UDP. In an exemplary implementation, the call-routing proxy 520*a* may apply any available resource selection algorithm to select a resource. As a result of the selection process applied by the call-routing proxy 520*a*, the total number of responses being broadcasted on the local multicast channel 120*a* for the originating automatic call director 110*a* can be reduced.

FIG. 7 illustrates an exemplary process for an automatic call director to select a resource for handling the call.

At step 710, the automatic call director 110*a* receives multiple responses from local resource servers 130 as well as one or more responses from remote resource servers via the call-routing proxies 520*a*-520*c*. In an exemplary implementation, responses from remote resource servers have been processed first by the remote call-routing proxies then by the local call-routing proxy to reduce the number of responses actually sent to the originating automatic call director 110*a* while still offering the optimal qualified resources in the distributed system 500.

At step 720, the automatic call director 110*a* selects a resource for handling the call. In an exemplary implementation, the automatic call director 110*a* may apply any available resource selection algorithm to select a resource from among the choices obtained to handle the call. An exemplary resource selection process will be described below with reference to FIG. 9.

At step 730, the automatic call director 110*a* connects the call to the selected resource.

At step 740, the automatic call director 110*a* generates and broadcasts a message on the multicast channel 120*a* indicating that call assignment. In an exemplary implementation, the message may include the call ID, the identifier of the assigned resource, and/or other information.

At step 750, both the local resource servers 130 and the call-routing proxy 520*a* obtain the message from the multicast channel 120*a*.

At step 760, depending on the identifier of the assigned resource, each local resource server 130 either releases the offered resource (if it is not the one assigned) or mark the offered resource as busy (if it is the one assigned).

At step 770, the call-routing proxy 520*a* sends the message to remote call-routing proxies 520*b* and 520*c* at other clusters of computing devices 510*b* and 510*c*, respectively.

At step 780, the call-routing proxies 520*b* and 520*c* broadcast the message on their respectively local multicast channel 120*b* or 120*c*. The remote resource servers perform appropriate tasks based on the message. For example, depending on the identifier of the assigned resource, each remote resource server either releases the offered resource (if it is not the one assigned) or marks the offered resource as busy (if it is the one assigned).

The distributed call-routing system 500 enables load sharing among multiple clusters of computing devices. In addition, by implementing one or more call-routing proxies, the distributed system becomes more scalable and packet traffic can be reduced.

V. An Exemplary Process for Selecting a Resource at a Resource Server

Figure 8:
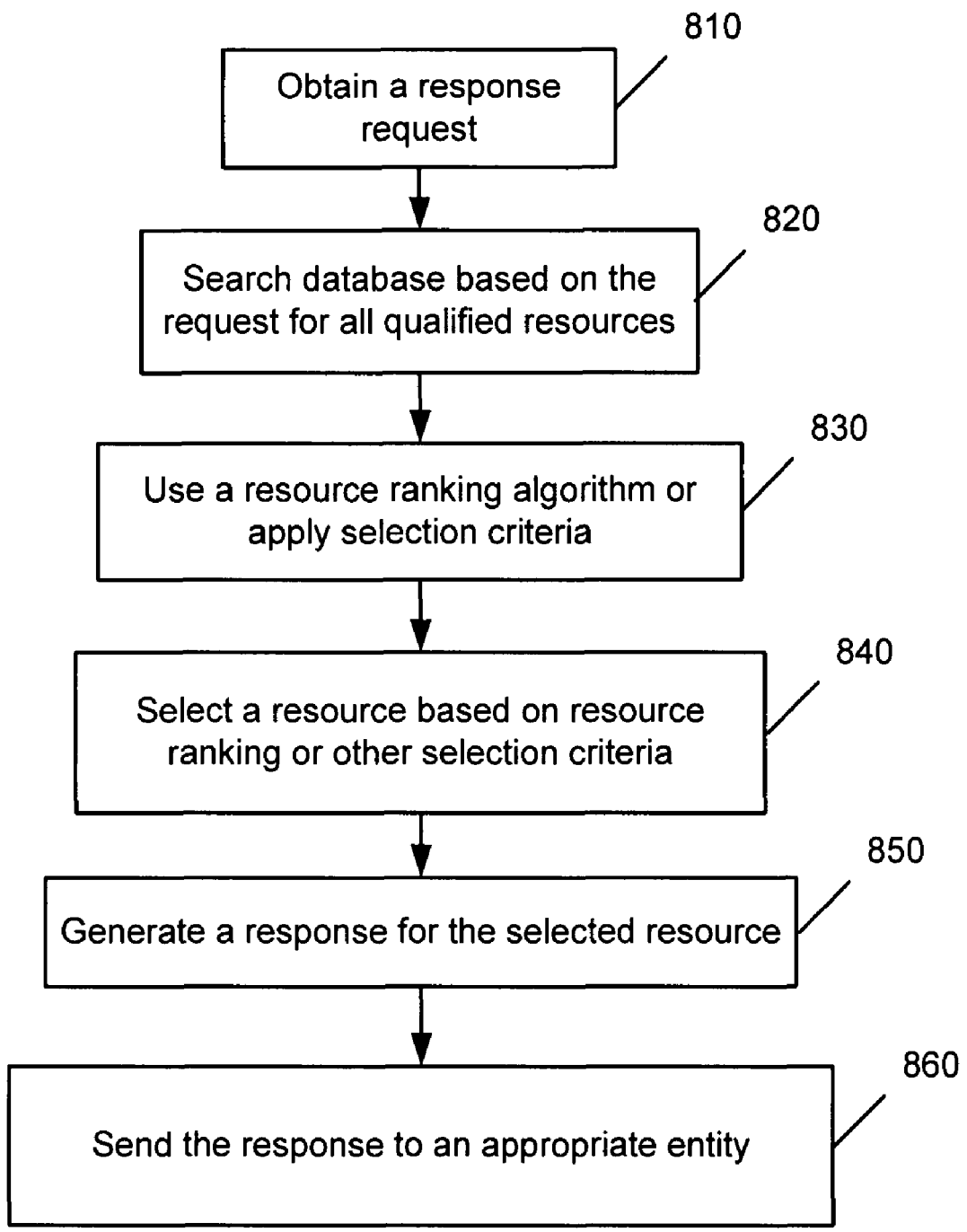
FIG. 8 illustrates an exemplary process for selecting a resource at a resource server.

FIG. 8 illustrates an exemplary process for a resource server 130 to select a resource based on a request from an automatic call director.

At step 810, a resource server 130 obtains a resource request from a multicast channel 120.

At step 820, the resource server searches a database (local, remote, or otherwise accessible to the server) based on the request for all qualified resources. A request typically includes a call ID and other information specific to the call. For example, a request may indicate a specific pool of agents who are qualified to handle the call.

At step 830, the resource server applies a resource ranking algorithm (or otherwise apply any selection criteria) to determine which resource among all qualified resources should be selected. The resource ranking algorithm may be based on call center routing rules (generally or specifically applicable to each call). Exemplary call center routing rules will be described in more detail in Section VIII below.

Various combinations of weighting techniques may be applied. In one exemplary implementation, the resource server may compare attributes among qualified resources to determine which resource has the highest score for a highest ranking attribute. Alternatively or in combination, the resource server may compare past performances and select the resource that has the best performance record. In yet other implementations, a weighted selection algorithm may be applied wherein various factors may be weighted differently depending on design choice. For example, algorithms may be designed such that a resource's chances of being selected are proportional to its attribute, performance, and/or other factors (e.g., weighted scores, etc.). A person skilled in the art will recognize that these and other resource ranking/selection algorithms may be applied singly or in combination depending on design choice.

At step 840, the resource server selects a resource based on results from the applied resource ranking algorithm. In another exemplary implementation, a resource server may sort the resources dynamically prior to obtaining a resource request (e.g., at step 810). For example, resources may be sorted upon logging on to a resource server. In this exemplary implementation, the resources may be pre-sorted into pools of resources by applying any resource ranking algorithm as described in step 830. When the resource server obtains a resource request, it determines which pool of resources is qualified to handle the call then selects the top ranking resource from that pool as a response to the request.

At step 850, the resource server generates a response to the resource request including information relating to the selected resource. In an exemplary implementation, the information may include the resource identifier, resource attributes, and/or other information that may be useful for the automatic call director 110 (or the call-routing proxy 520) to select the optimal resource for handling the call.

At step 860, the resource server sends the response to the appropriate recipient via UDP (e.g., a call-routing proxy or an automatic call director).

In an exemplary implementation that includes a remote call-routing proxy 520*b* in a remote cluster of computing devices 510*b*, the call-routing proxy 520*b* obtains the responses from all the remote resource servers within its cluster of computing devices 510*b* and reduces the number of responses before forwarding them to the call-routing proxy 520*a* at the originating cluster of computing devices 510*a*. In an exemplary implementation, the responses can be reduced by applying any available or later developed resource ranking algorithm.

The call-routing proxy 520*a* receives responses from various remote call-routing proxies and remote relay servers (not shown in FIG. 5). Like the remote call-routing proxy 520*b*, the call-routing proxy 520*a* reduces the number of received responses before sending the reduced responses to the originating automatic call director 110*a*. In an exemplary implementation, the responses can be reduced by applying any available or later developed resource ranking algorithm.

The originating automatic call director 110*a* obtains multiple responses (both from local resource servers 130 as well as from a relay server 220 or a call-routing proxy 520, as applicable). The automatic call director 110*a* then applies a resource ranking algorithm to select one resource for handling the call.

VI. An Exemplary Process for Selecting a Resource at an Automatic Call Director

Figure 9:
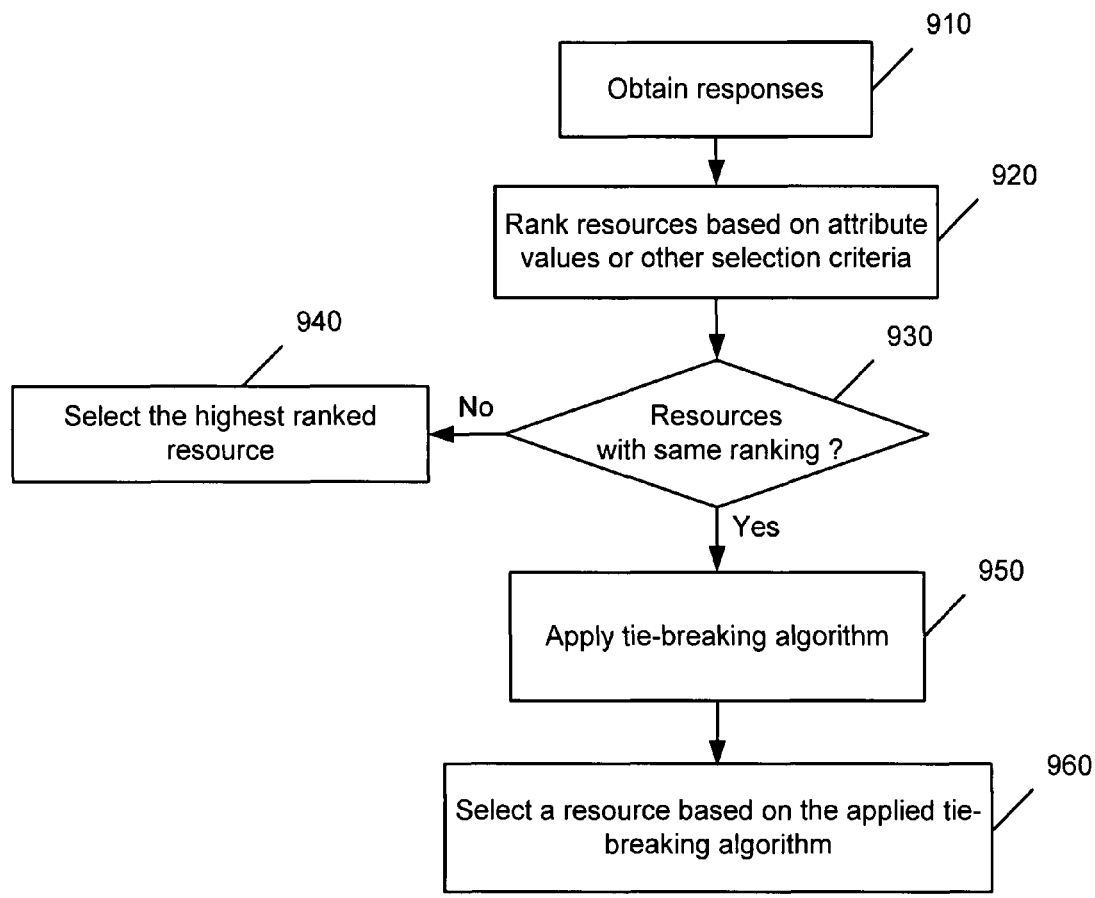
FIG. 9 illustrates an exemplary process for selecting a resource at an automatic call director.

FIG. 9 illustrates an exemplary process for an automatic call director to select an optimal resource to handle a call.

At step 910, the originating automatic call director 110*a* obtains multiple responses.

At step 920, the automatic call director 110*a* applies a resource ranking algorithm (or otherwise apply selection criteria) to determine which resource among all qualified resources should be selected. For example, the automatic call director 110*a* may rank resources based on attribute values assigned to each resource. Attribute information is typically included in the responses. In general, the resource ranking algorithm may be based on call center routing rules (generally or specifically applicable to each call). Exemplary call center routing rules will be described in more detail in Section VIII below.

Various combinations of weighting techniques may be applied. In one exemplary implementation, the automatic call director may compare attributes among the qualified resources to determine which resource has the highest score for a highest ranking attribute. Alternatively or in combination, the automatic call director may compare past performances and select the resource that has the best performance record. In yet other implementations, a weighted selection algorithm may be applied wherein various factors may be weighted differently depending on design choice. For example, algorithms may be designed such that a resource's chances of being selected are proportional to its attribute, performance, and/or other factors (e.g., weighted scores, etc.). A person skilled in the art will recognize that these and other resource ranking/selection algorithms may be applied singly or in combination depending on design choice.

At step 930, the call manger 110*a* determines whether there are multiple resources having the same ranking position.

At step 940, if there is a top ranked resource, then that resource is selected to handle the call.

At step 950, if there are multiple top ranked resources, then the automatic call director 110*a* may apply a tie-breaking algorithm. In an exemplary implementation, a tie-breaking algorithm may include comparing the last time each top-ranked resource has taken a call and selecting the resource that has been waiting for the longest time. A person skilled in the art will recognize that other tie-breaking algorithms may be applied in the alternative or in combination depending on design choice.

At step 960, the automatic call director 110*a* selects a resource based on the applied tie-breaking algorithm.

VII. Other Exemplary Applications

A distributed call-routing system does not necessarily require its clusters of computing devices to include all relay servers or all call-routing proxies. In an exemplary implementation, each cluster of computing devices may have either a relay server or a call-routing proxy depending on implementation choice. In an exemplary implementation, a separate computing device may be implemented for performing relay server functions or call-routing proxy functions at any particular cluster of computing devices. In another exemplary implementation, the same computing device may be enabled to toggle between a relay server mode or a call-routing proxy mode.

Figure 10:
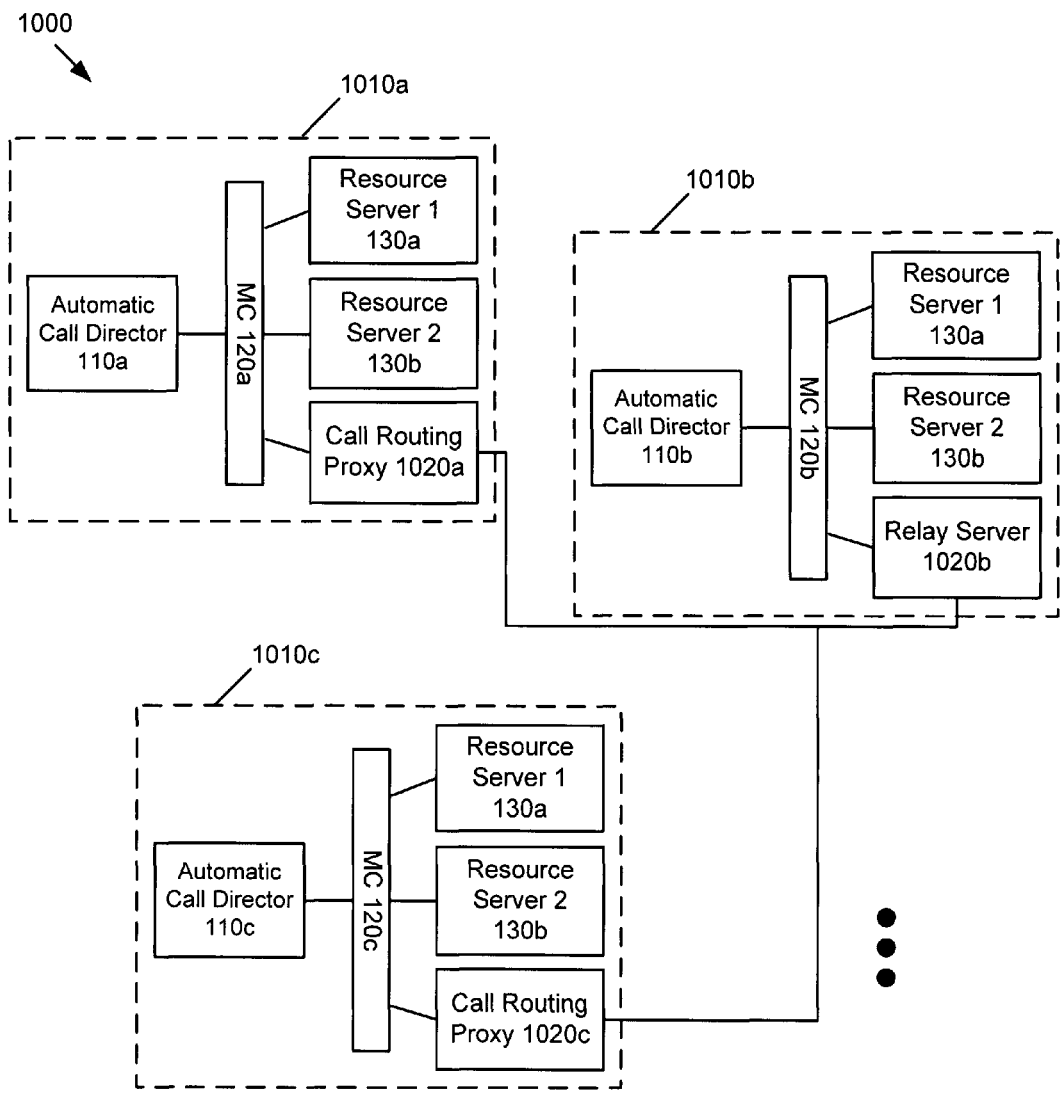
FIG. 10 illustrates another exemplary distributed call-routing system having multiple clusters of computing devices.

FIG. 10 illustrates another exemplary system 1000 including multiple clusters of computing devices 1010. The number of clusters of computing devices 1010 illustrated in the system 1000 is merely exemplary. More or fewer clusters of computing devices 1010 may be implemented depending on design choice.

The exemplary system 1000 includes three clusters of computing devices 1010*a*-1010*c*. The exemplary cluster of computing devices 1010 includes the same components as the clusters of computing devices described above except: the cluster of computing devices 1010*a* includes a call-routing proxy 1020*a*; the cluster of computing devices 1010*b* includes a relay server 1020*b*; and the cluster of computing devices 1010*c* includes a call-routing proxy 1020*c*. The relay server 1020*b* and the call-routing proxies 1020*a* and 1020*c* are connected to each other by persistent transmission control protocol (TCP) connections.

The relay server 1020*b* generally functions as described above regarding relay server 220. The call-routing proxy 1020*a* generally functions as described above regarding the call-routing proxy 520.

One skilled in the art will recognize that still other distributed system implementation and configurations are possible.

VIII. Call-Routing Rules

Each call received at a call center can be routed to a different resource depending on call center routing rules. Call center routing rules may be one or more of (or a combination of) results-based rules, allocation-based rules, attribute-based rules, volume-based rules, and/or other rules.

Results-based rules include rules that automatically self update based on performance. For example, the top 10 percent of agents can dynamically change depending on calls and results in any specific time interval. In an exemplary implementation, a weighted results based algorithm may be used to include any desired result factors.

Allocation-based rules include rules that determine what percentage of calls should be routed to which pool of resources. For example, 50 percent of all calls to a store may be allocated to the phone lines of that store.

Attribute-based rules includes rules that determine where to route each call based on specific skills, performance, characteristics of each call, and/or attributes of each resource. For example, if the call center determines that the caller needs assistance by someone who can speak a certain foreign language, the call may be routed to a resource with that capability (e.g., an agent who can speak that language). In an exemplary implementation, the results-based rules may be considered as one type of attribute-based rules.

Volume-based rules include rules that determine what percentage of calls should be routed to each pool of resources based on the volume of calls already being routed to those resources. For example, when a store is already at 90% capacity, all subsequent calls may be routed elsewhere.

These rules and/or other rules may be applied singly or in combination with each other. Any particular hierarchy of these rules in application can be customer-dependent, time-dependent, predetermined by default, and/or otherwise customized statically or dynamically. In an exemplary implementation, any particular rules hierarchy can be implemented in a routing script, or any other technologies known in the art.

IX. Exemplary Operating Environments

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method for selecting a resource for handling a call in a distributed call-routing system, comprising:
    (a) obtaining, at a local call-routing proxy, a resource request for handling a call from a local automatic call director;
    (b) distributing the request to a plurality of remote call-routing proxies, each remote call-routing proxy being configured to:
        (1) obtain responses to the request from a plurality of servers storing data relating to a plurality of resources;
        (2) process the responses from the servers to produce a first reduced number of responses; and
        (3) send the first reduced number of responses to the local call-routing proxy;
    (c) processing responses from remote call-routing proxies at the local call-routing proxy;
    (d) enabling the local automatic call director to obtain a second reduced number of responses based on the processing in (c); and
    (e) enabling the local automatic call director to select the resource from among the plurality of resources to handle the call based at least on the second reduced number of responses.

2. The method of claim 1, wherein said distributing is performed in parallel to said plurality of remote call-routing proxies.

3. The method of claim 1, wherein said processing of responses from the servers includes:
    (i) aggregating responses from said servers;
    (ii) evaluating said aggregated responses; and
    (iii) generating said first reduced number of responses based on said evaluating.

4. The method of claim 3, wherein said evaluating includes:
    ranking resources associated with said responses from said servers; and selecting one or more resources based on said ranking.

5. The method of claim 3, wherein said evaluating includes applying a resource selection algorithm such that probability of selecting a resource is proportional to a weighted value assigned to that resource.

6. The method of claim 1, wherein said processing of responses from remote call-routing proxies includes:
    (i) aggregating responses from said remote call-routing proxies;
    (ii) evaluating said aggregated responses; and
    (iii) generating said second reduced number of responses based on said evaluating.

7. The method of claim 6, wherein said evaluating includes:
    ranking resources associated with said responses from said remote call-routing proxies; and selecting one or more resources based on said ranking.

8. The method of claim 6, wherein said evaluating includes applying a resource selection algorithm such that the probability of selecting a resource is proportional to a weighted value assigned to that resource.

9. The method of claim 1, wherein said enabling in (e) includes applying a resource selection algorithm such that the probability of selecting a resource is proportional to a weighted value assigned to that resource.

10. A distributed call-routing system, comprising:
    a plurality of clusters of computing devices, at least some of said clusters including an automatic call director, a set of resource servers, and a call-routing proxy, said call-routing proxy being configured to:
    (a) obtain a resource request for handling a call from a local automatic call director;
    (b) distribute the request to a plurality of remote call-routing proxies at remote clusters of computing devices, each remote call-routing proxy being configured to:
        (1) obtain responses to the request from a plurality of servers storing data relating to a plurality of resources;
        (2) process the responses from the servers to produce a first reduced number of responses; and
        (3) send the first reduced number of responses to the call-routing proxy;
    (c) process responses from remote call-routing proxies;
    (d) enable the local automatic call director to obtain a second reduced number of responses based on the processing in (c); and
    (e) enabling the local automatic call director to select a resource from among the plurality of resources to handle the call.

11. The system of claim 10, wherein said remote call-routing proxy is further configured to:
    (i) aggregate responses from said servers;
    (ii) evaluate said aggregated responses; and
    (iii) generate said first reduced number of responses based on said evaluation in (ii).

12. The system of claim 11, wherein said evaluating includes:
    ranking resources associated with said responses from said servers; and selecting one or more resources based on said ranking.

13. The system of claim 11, wherein said evaluating includes applying a resource selection algorithm such that probability of selecting a resource is proportional to a weighted value assigned to that resource.

14. The system of claim 10, wherein said call-routing proxy is further configured to:
(i) aggregate responses from said remote call-routing proxies;
(ii) evaluate said aggregated responses; and
(iii) generate said second reduced number of responses based on said evaluation in (ii).

15. A non-transitory computer-readable storage medium for selecting a resource for handling a call in a distributed call-routing system comprising logic instructions that, when executed:
(a) obtain, at a local call-routing proxy, a resource request for handling a call from a local automatic call director;
(b) distribute the request to a plurality of remote call-routing proxies, each remote call-routing proxy being configured to:
(1) obtain responses to the request from a plurality of servers storing data relating to a plurality of resources;
(2) process the responses from the servers to produce a first reduced number of responses; and
(3) send the first reduced number of responses to the local call-routing proxy;
(c) process responses from remote call-routing proxies at the local call-routing proxy;
(d) enable the local automatic call director to obtain a second reduced number of responses based on the processing in (c); and
(e) enable the local automatic call director to select the resource from among the plurality of resources to handle the call.

16. The computer-readable storage medium of claim 15, wherein said remote call-routing proxy is further configured to:
(i) aggregate responses from said servers;
(ii) evaluate said aggregated responses; and
(iii) generate said first reduced number of responses based on said evaluation in (ii).

17. The computer-readable storage medium of claim 16, wherein said evaluate includes:
ranking resources associated with said responses from said servers; and selecting one or more resources based on said ranking.

18. The computer-readable storage medium of claim 16, wherein said evaluate includes applying a resource selection algorithm such that the probability of selecting a resource is proportional to a weighted value assigned to that resource.

19. The computer-readable storage medium of claim 15, further comprising logic instructions that, when executed cause the local call-routing proxy to:
(i) aggregate responses from said remote call-routing proxies;
(ii) evaluate said aggregated responses; and
(iii) generate said second reduced number of responses based on said evaluation in (ii).

20. A distributed call-routing system, comprising:
(a) means for receiving, at a local call-routing proxy, a resource request for handling a call from a local automatic call director;
(b) means for distributing the request to a plurality of remote call-routing proxies, each remote call-routing proxy being configured to:
(1) obtain responses to the request from a plurality of servers storing data relating to a plurality of resources;
(2) process the responses from the servers to produce a first reduced number of responses; and
(3) send the first reduced number of responses to the local call-routing proxy;
(c) means for processing responses from remote call-routing proxies at the local call-routing proxy;
(d) means for enabling the local automatic call director to obtain a second reduced number of responses based on the processing in (c); and
(e) means for enabling the local automatic call director to select a resource from among the plurality of resources to handle the call.

* * * * *